US012638884B2

(12) United States Patent
Chen

(10) Patent No.: US 12,638,884 B2
(45) Date of Patent: May 26, 2026

(54) FLEXIBLE SUPPORT MEMBER, DISPLAY MODULE, AND MOBILE TERMINAL

(71) Applicants: WUHAN CHINA STAR OPTOELECTRONICS TECHNOLOGY CO., LTD., Wuhan (CN); WUHAN CHINA STAR OPTOELECTRONICS SEMICONDUCTOR DISPLAY TECHNOLOGY CO., LTD., Wuhan (CN)

(72) Inventor: Xia Chen, Wuhan (CN)

(73) Assignees: WUHAN CHINA STAR OPTOELECTRONICS TECHNOLOGY CO., LTD., Wuhan (CN); WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 827 days.

(21) Appl. No.: 17/442,093

(22) PCT Filed: Jul. 21, 2021

(86) PCT No.: PCT/CN2021/107520
§ 371 (c)(1),
(2) Date: Sep. 22, 2021

(87) PCT Pub. No.: WO2022/267137
PCT Pub. Date: Dec. 29, 2022

(65) Prior Publication Data
US 2024/0028079 A1     Jan. 25, 2024

(30) Foreign Application Priority Data
Jun. 21, 2021     (CN) .......................... 202110684899.3

(51) Int. Cl.
*G06F 1/16* (2006.01)

(52) U.S. Cl.
CPC .......... *G06F 1/1652* (2013.01); *G06F 1/1607* (2013.01); *G06F 1/1656* (2013.01)

(58) Field of Classification Search
CPC .... G06F 1/1652; G06F 1/1607; G06F 1/1656; G06F 1/1637; B32B 2307/546;
(Continued)

(56) References Cited

U.S. PATENT DOCUMENTS

| | | | | |
|---|---|---|---|---|
| 5,906,873 | A | * 5/1999 | Kim | ...................... A61B 42/00 2/2.5 |
| 7,550,189 | B1 | * 6/2009 | McKnight | ................ B64C 3/26 148/563 |

(Continued)

FOREIGN PATENT DOCUMENTS

| | | |
|---|---|---|
| CN | 105118389 A | 12/2015 |
| CN | 107230429 A | 10/2017 |

(Continued)

OTHER PUBLICATIONS

Chinese Office Action issued in corresponding Chinese Patent Application No. 202110684899.3 dated Mar. 31, 2022, pp. 1-7.
(Continued)

*Primary Examiner* — Nathan L Van Sell
(74) *Attorney, Agent, or Firm* — PV IP PC; Christopher S. Ruprecht; Wei Te Chung

(57) ABSTRACT

A flexible support member, a display module, and a mobile terminal are disclosed by embodiments of the present disclosure. The flexible support member includes an elastic component and a rigid support component embedded in the elastic component. The rigid support component includes at least a first support layer and a second support layer, and elastic modulus of the first support layer is smaller than (Continued)

elastic modulus of the second support layer. In the embodiments of the present disclosure, by embedding the rigid support component in the elastic component to obtain two support layers with different rigidities, supporting and restoring performances of composite structure are improved.

18 Claims, 11 Drawing Sheets

(58) Field of Classification Search
CPC ....... B32B 2457/20; B32B 3/04; B32B 3/266;
B32B 7/022; B32B 15/06; B32B 15/08;
B32B 15/18; B32B 25/20; G09F 9/301
See application file for complete search history.

(56) References Cited

U.S. PATENT DOCUMENTS

| | | | |
|---|---|---|---|
| 9,211,690 B1 * | 12/2015 | McKnight | ................. B32B 3/08 |
| 10,642,318 B1 * | 5/2020 | Lehmann | ................. G06F 3/016 |
| 2015/0212547 A1 | 7/2015 | Park | |
| 2017/0075459 A1 | 3/2017 | Kauhaniemi | |
| 2018/0290430 A1 | 10/2018 | Liu | |

FOREIGN PATENT DOCUMENTS

| | | |
|---|---|---|
| CN | 109285459 A | 1/2019 |
| CN | 109473046 A | 3/2019 |
| CN | 208622359 U | 3/2019 |
| CN | 110767095 A | 2/2020 |
| CN | 111192525 A | 5/2020 |
| CN | 111327735 A | 6/2020 |
| CN | 111508370 A | 8/2020 |
| CN | 111640770 A | 9/2020 |
| CN | 111833751 A | 10/2020 |
| CN | 111986575 A | 11/2020 |
| CN | 112086030 A | 12/2020 |
| CN | 112908174 A | 6/2021 |
| KR | 20160148811 A | 12/2016 |
| KR | 20190025799 A | 3/2019 |
| KR | 20200012359 A | 2/2020 |
| TW | I661344 B | 6/2019 |

OTHER PUBLICATIONS

Notification to Grant Patent Right for Invention issued in corresponding Chinese Patent Application No. 202110684899.3 dated May 26, 2022, pp. 1-6.
International Search Report in International application No. PCT/CN2021/107520, mailed on Mar. 16, 2022.
Written Opinion of the International Searching Authority in International application No. PCT/CN2021/107520, mailed on Mar. 16, 2022.

* cited by examiner

100

200

300 { 500

400

100

400

410

100

100

100

610

510

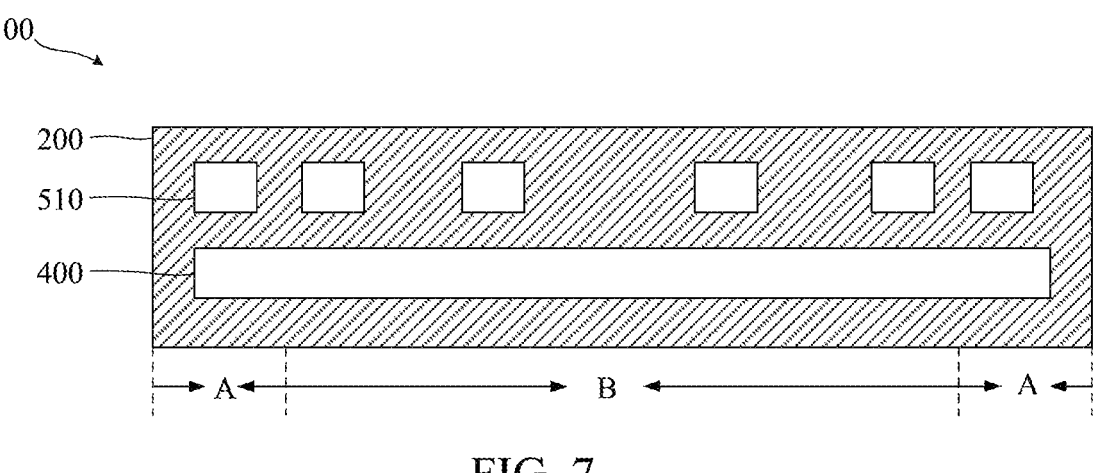
FIG. 7
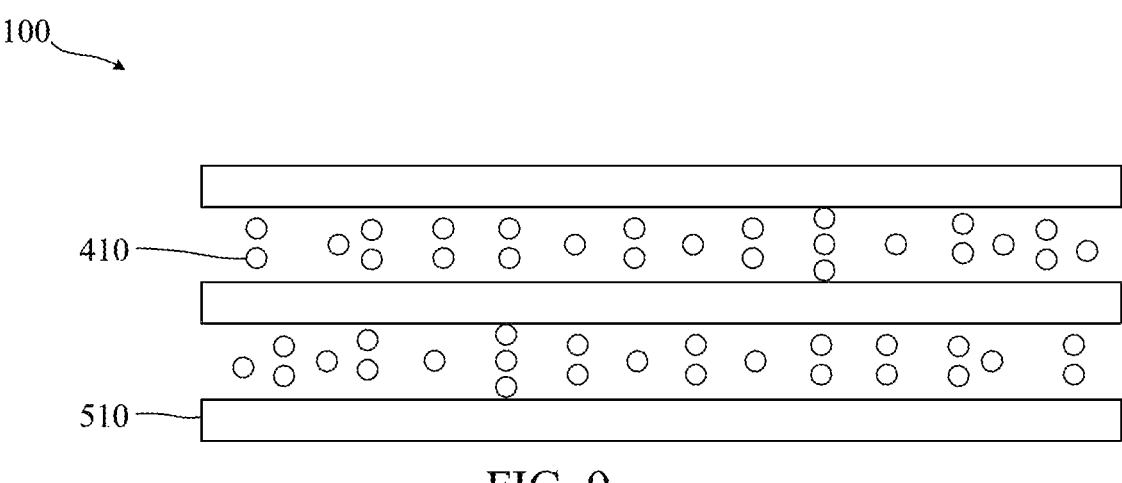
FIG. 8
FIG. 9

100

510

511                    512

θ₂

Y

X

θ₁

X

100

C ————————————————————————————— C'

510

511                                        512

520

Y

X

100

520    510

510

1

FLEXIBLE SUPPORT MEMBER, DISPLAY MODULE, AND MOBILE TERMINAL

RELATED APPLICATIONS

This application is a Notional Phase of PCT Patent Application No. PCT/CN2021/107520 having international filing date of Jul. 21, 2021, which claims the benefit of priority of Chinese Patent Application No. 202110684899.3 filed on Jun. 21, 2021. The contents of the above applications are all incorporated by reference as if fully set forth herein in their entirety.

FIELD OF INVENTION

The present disclosure relates to the field of display technologies, and in particular to a flexible support member, display module, and mobile terminal.

BACKGROUND OF INVENTION

In recent years, flexible display products have attracted extensive attention. Flexible display products include fixed curved products, foldable products, expandable screen products, rollable products, etc. As bending areas are widened, corresponding rigid support areas are widened, resulting in reduced rebound force of rigid support components, thereby extremely reducing supporting and restoring of the rigid support components. Moreover, display panels are prone to warping during rolling processes, so that lifespans of display modules are drastically reduced.

Therefore, there is an urgent need for a flexible support member, a display module, and a mobile terminal, so as to solve above technical problems.

SUMMARY OF INVENTION

Technical Problems

Embodiments of the present disclosure provide a flexible support member, a display module, and a mobile terminal, which can alleviate the technical problems that the rebound force of the current rigid support components is reduced, and the display panels are prone to warping during rolling processes, so that the lifespans of the display modules are drastically reduced.

Technical Solutions

In order to solve the above problems, technical solutions provided by the present disclosure are as follows:

An embodiment of the present disclosure provides a flexible support member, comprising: an elastic component and a rigid support component embedded in the elastic component, wherein the rigid support component is integrally disposed with the elastic component;

wherein the rigid support component includes at least a first support layer and a second support layer located on one side of the first support layer, and elastic modulus of the first support layer is smaller than elastic modulus of the second support layer.

In one embodiment, the first support layer includes a plurality of first openings, the second support layer includes a plurality of first support units disposed in parallel, and an extension direction of each one of the first support units is parallel to a first direction; wherein at least one of the first openings is disposed between two adjacent ones of the first support units.

In one embodiment, the rigid support component further includes a third support layer located on the other side of the first support layer, and elastic modulus of the third support layer is greater than the elastic modulus of the second support layer; wherein the third support layer includes a plurality of second support units disposed at intervals, and extension directions of any two of the second support units are parallel.

In one embodiment, the extension direction of the second support unit is parallel to a second direction, and an included angle between the first direction and the second direction is greater than 0 degrees and less than 180 degrees.

In one embodiment, the flexible support member includes a plane area and a bending area, and in a direction close to a center of the bending area, a distance between the two adjacent first support units gradually increases, and a distance between two ones of the first openings adjacent to each other gradually decreases.

In one embodiment, an area of an end surface of the first support unit on one side close to the first support layer is greater than an area of an end surface of the first support unit on one side away from the first support layer.

In one embodiment, an aperture of each one of the first openings is smaller than the distance between the two adjacent first support units, and the distance between the two adjacent first openings is smaller than the corresponding distance between the two adjacent first support units.

In one embodiment, an included angle between the first support unit and the first direction includes at least a first included angle and a second included angle; wherein the first included angle is different from the second included angle.

An embodiment of the present disclosure further includes a display module, comprising: a flexible support member and a display panel on the flexible support member, wherein the flexible support member and the display panel are combined into one body, the flexible support member includes an elastic component and a rigid support component embedded in the elastic component, and the rigid support component is integrally disposed with the elastic component;

wherein the rigid support component includes at least a first support layer and a second support layer located on one side of the first support layer, and elastic modulus of the first support layer is smaller than elastic modulus of the second support layer.

In one embodiment, the first support layer includes a plurality of first openings, the second support layer includes a plurality of first support units disposed in parallel, and an extension direction of each one of the first support units is parallel to a first direction; wherein at least one of the first openings is disposed between two adjacent ones of the first support units.

In one embodiment, the rigid support component further includes a third support layer located on the other side of the first support layer, and elastic modulus of the third support layer is greater than the elastic modulus of the second support layer; wherein the third support layer includes a plurality of second support units disposed at intervals, and extension directions of any two of the second support units are parallel.

In one embodiment, the extension direction of the second support unit is parallel to a second direction, and an included angle between the first direction and the second direction is greater than 0 degrees and less than 180 degrees.

In one embodiment, the flexible support member includes a plane area and a bending area, and in a direction close to a center of the bending area, a distance between the two adjacent first support units gradually increases, and a distance between two ones of the first openings adjacent to each other gradually decreases.

In one embodiment, an area of an end surface of the first support unit on one side close to the first support layer is greater than an area of an end surface of the first support unit on one side away from the first support layer.

In one embodiment, an aperture of each one of the first openings is smaller than the distance between the two adjacent first support units, and the distance between the two adjacent first openings is smaller than the corresponding distance between the two adjacent first support units.

In one embodiment, an included angle between the first support unit and the first direction includes at least a first included angle and a second included angle; wherein the first included angle is different from the second included angle.

A embodiment of the present disclosure further provides a mobile terminal, comprising: a display module and a terminal body, wherein the terminal body and the display module are combined into one body, the display module includes a flexible support member and a display panel on the flexible support member, the flexible support member and the display panel are combined into one body, the flexible support member includes an elastic component and a rigid support component embedded in the elastic component, and the rigid support component is integrally disposed with the elastic component;

wherein the rigid support component includes at least a first support layer and a second support layer located on one side of the first support layer, and elastic modulus of the first support layer is smaller than elastic modulus of the second support layer.

In one embodiment, the first support layer includes a plurality of first openings, the second support layer includes a plurality of first support units disposed in parallel, and an extension direction of each one of the first support units is parallel to a first direction; wherein at least one of the first openings is disposed between two adjacent ones of the first support units.

In one embodiment, the rigid support component further includes a third support layer located on the other side of the first support layer, and elastic modulus of the third support layer is greater than the elastic modulus of the second support layer; wherein the third support layer includes a plurality of second support units disposed at intervals, and extension directions of any two of the second support units are parallel.

In one embodiment, the extension direction of the second support unit is parallel to a second direction, and an included angle between the first direction and the second direction is greater than 0 degrees and less than 180 degrees.

Beneficial Effect of the Embodiments of the Present Disclosure

In the embodiments of the present disclosure, by embedding the rigid support component in the elastic component, the rigid support component is integrally disposed with the elastic component, and the rigid support component includes two support layers with different rigidities, for optimizing supporting and restoring performances, so that the supporting and restoring performances of the composite structure are improved, thereby extending the lifespans of the display modules.

DESCRIPTION OF DRAWINGS

FIG. 7 is a schematic structural diagram of a seventh structure of a flexible support member provided by an embodiment of the present disclosure.

FIG. 8 is a schematic structural diagram of an eighth structure of a flexible support member provided by an embodiment of the present disclosure.

FIG. 9 is a partial schematic top view of a ninth structure of a flexible support member provided by an embodiment of the present disclosure.

DETAILED DESCRIPTION OF PREFERRED EMBODIMENTS

Figure 1:
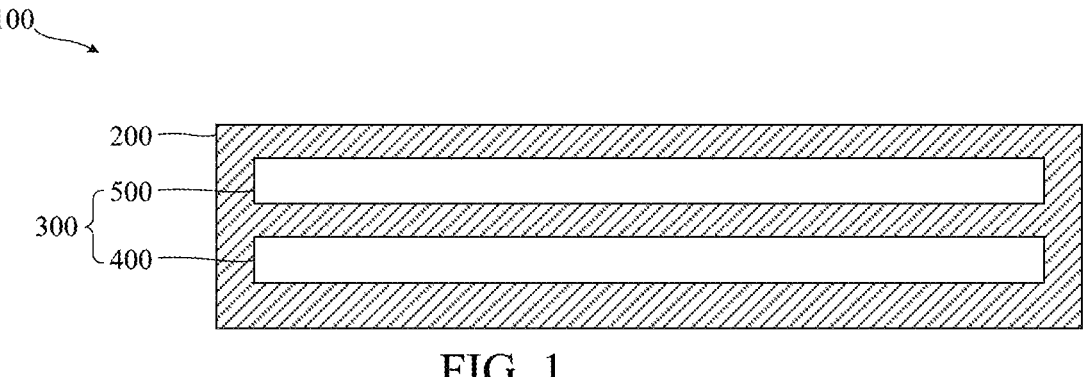
FIG. 1 is a schematic structural diagram of a first structure of a flexible support member provided by an embodiment of the present disclosure.

The present disclosure provides a flexible support member, a display module, and a mobile terminal. In order to make the purpose, technical solution, and effect of the present disclosure clearer and definite, the present disclosure will be further described in detail below with reference to the attached drawings and embodiments. It should be understood that the specific embodiments described herein are only used to explain the present disclosure, and are not used to limit the present disclosure.

The embodiments of the present disclosure provide a flexible support member, a display module, and a mobile terminal. Detailed descriptions are given below. It should be noted that an order of description in the following embodiments is not meant to limit the preferred order of the embodiments.

Please refer to FIGS. 1-14. An embodiment of the present disclosure provides a flexible support member 100 which includes an elastic component 200 and a rigid support component 300 embedded in the elastic component 200, wherein the rigid support component 300 is integrally disposed with the elastic component 200.

The rigid support component 300 includes at least a first support layer 400 and a second support layer 500 located on one side of the first support layer 400, and elastic modulus of the first support layer 400 is smaller than elastic modulus of the second support layer 500.

In the embodiment of the present disclosure, by embedding the rigid support component in the elastic component, the rigid support component is integrally disposed with the elastic component, and the rigid support component includes two support layers with different rigidities, for optimizing supporting and restoring performances, so that the supporting and restoring performances of the composite structure is improved, thereby extending lifespans of the display modules.

The technical solution of the present disclosure is described in combination with specific embodiments.

The flexible support member 100 includes an elastic component 200 and a rigid support component 300 embedded in the elastic component 200. The rigid support component 300 is integrally disposed with the elastic component 200. The rigid support component 300 includes at least a first support layer 400 and a second support layer 500 located on one side of the first support layer 400. Elastic modulus of the first support layer 400 is smaller than elastic modulus of the second support layer 500. Refer to FIG. 1. By embedding the rigid support component 300 in the elastic component 200, the rigid support component 300 is integrally disposed with the elastic component 200, and the rigid support component 300 includes two support layers with different rigidities, for optimizing supporting and restoring performances, so that the supporting and restoring performances of the composite structure are improved, thereby extending the lifespans of the display modules 10.

In FIGS. 1-14, X being a first direction and Y being a second direction are taken as examples for description.

Figure 2:
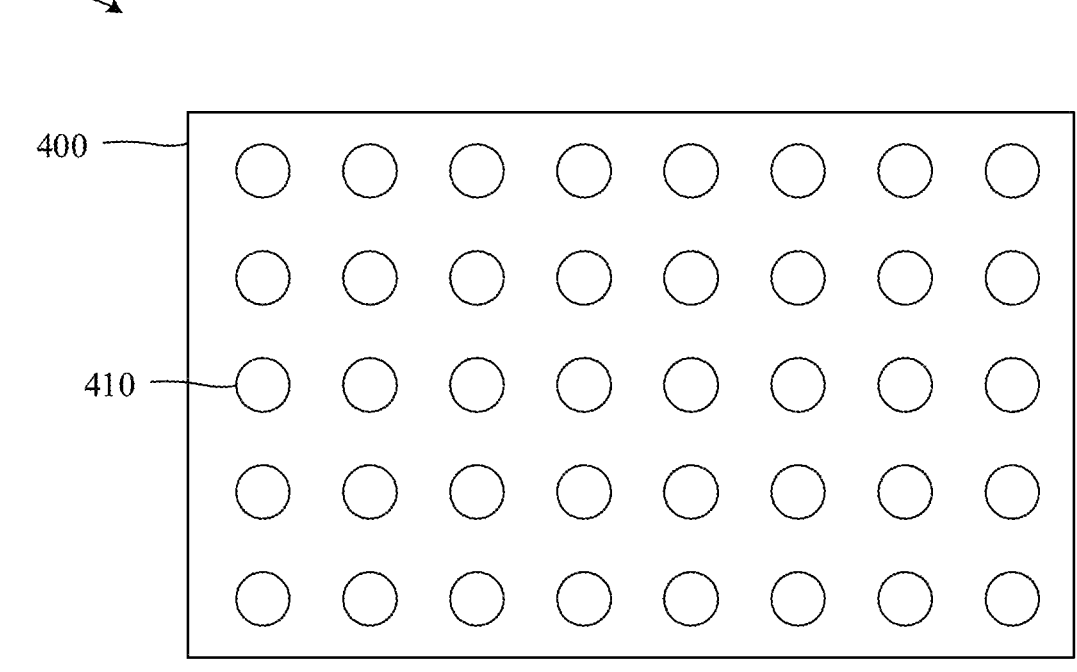
FIG. 2 is a partial schematic top view of a second structure of a flexible support member provided by an embodiment of the present disclosure.
Figure 3:
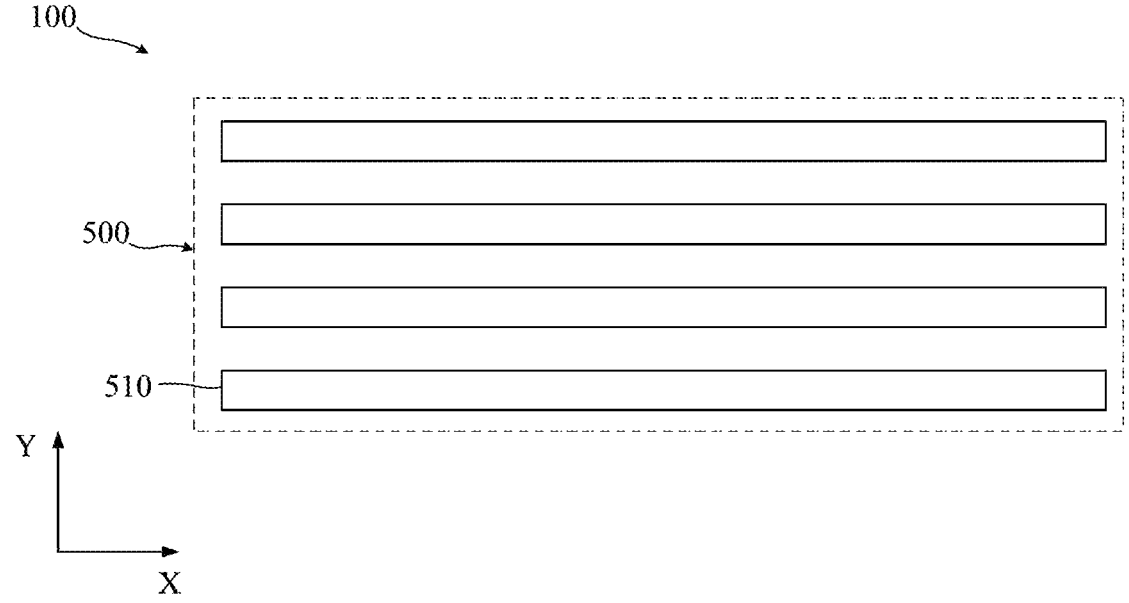
FIG. 3 is a partial schematic top view of a third structure of a flexible support member provided by an embodiment of the present disclosure.

For details, refer to FIGS. 2, 3, and 9. In the present embodiment, the first support layer 400 includes a plurality of first openings 410, and the second support layer 500 includes a plurality of first support units 510 disposed in parallel. An extension direction of each one of the first support units 510 is parallel to the first direction. At least one of the first openings 410 is disposed between two adjacent ones of the first support units 510. The first support unit 510 may be strip-shaped. That is, the strip-shaped first support unit 510 has great rigidity, and can provide an improved support effect. The first support layer 400 includes the plurality of first openings 410, which means that the first support layer 400 is grid-shaped. The grid-shaped first support layer 400 plays a role of supporting and helping restoring after bending. Accordingly, the two cooperate with each other to achieve a better supporting and restoring effect.

In the present embodiment, the first support layer 400 and the second support layer 500 are separately disposed, and a flexible component is filled between the first support layer 400 and the second support layer 500. For details, please refer to FIG. 1.

Figure 4:
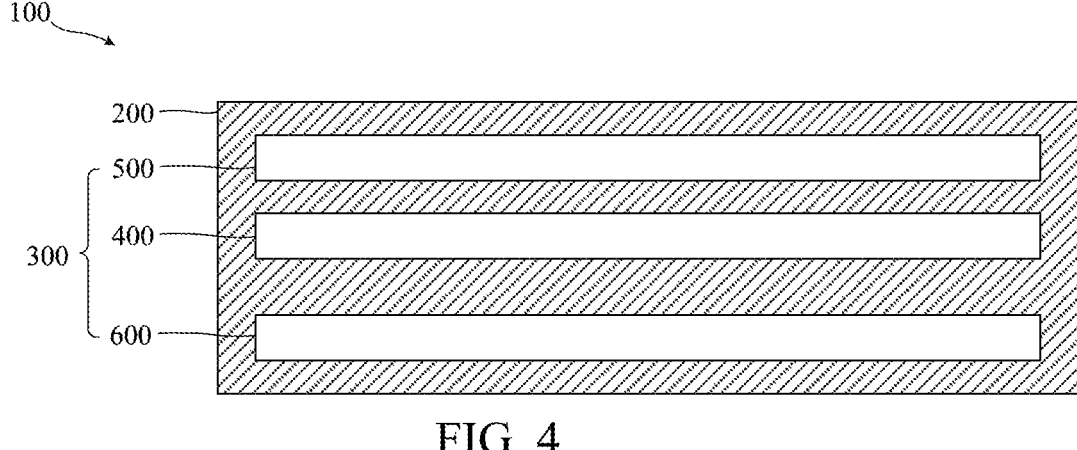
FIG. 4 is a schematic structural diagram of a fourth structure of a flexible support member provided by an embodiment of the present disclosure.
Figure 5:
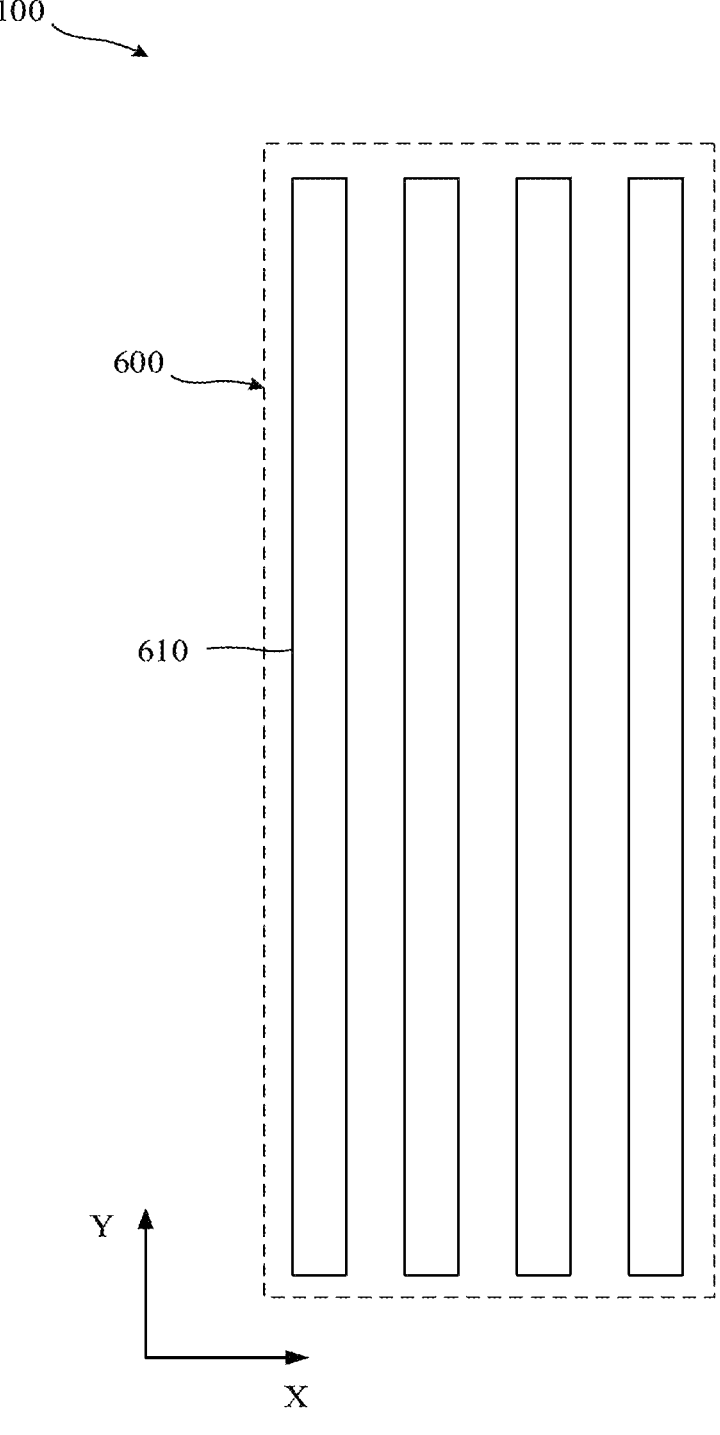
FIG. 5 is a partial schematic top view of a fifth structure of a flexible support member provided by an embodiment of the present disclosure.
Figure 6:
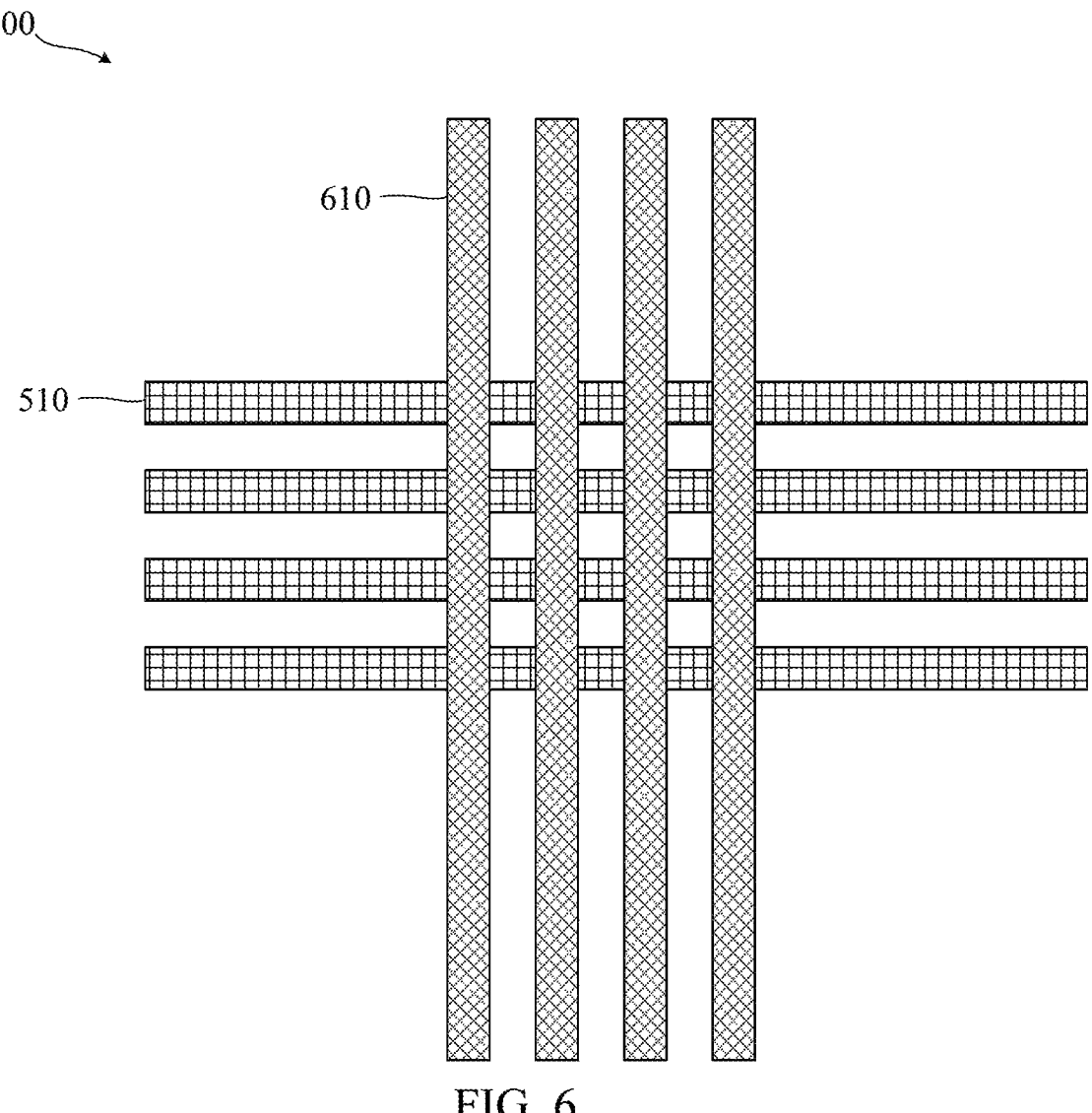
FIG. 6 is a partial schematic top view of a sixth structure of a flexible support member provided by an embodiment of the present disclosure.
Figure 10:
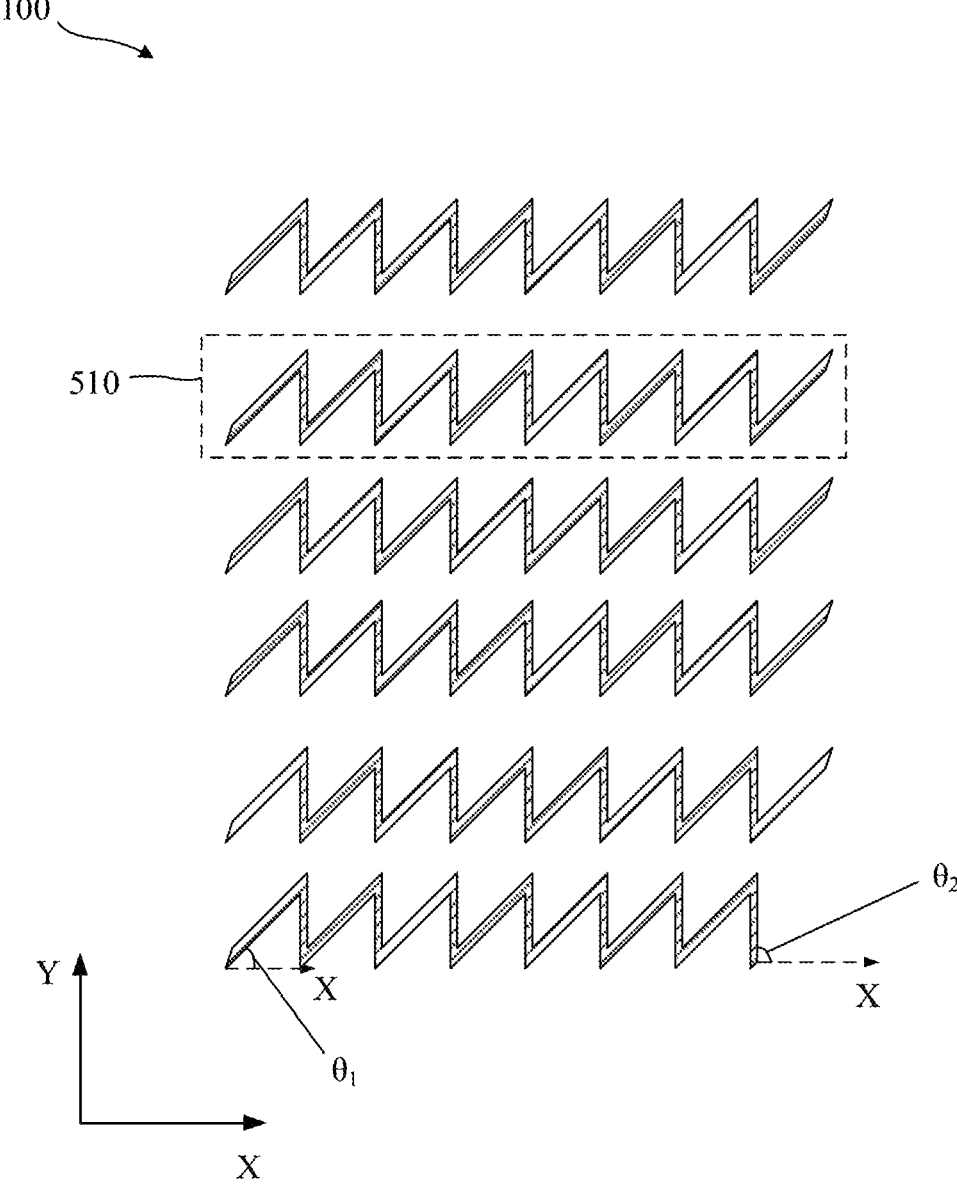
FIG. 10 is a partial schematic top view of a tenth structure of a flexible support member provided by an embodiment of the present disclosure.
Figure 11:
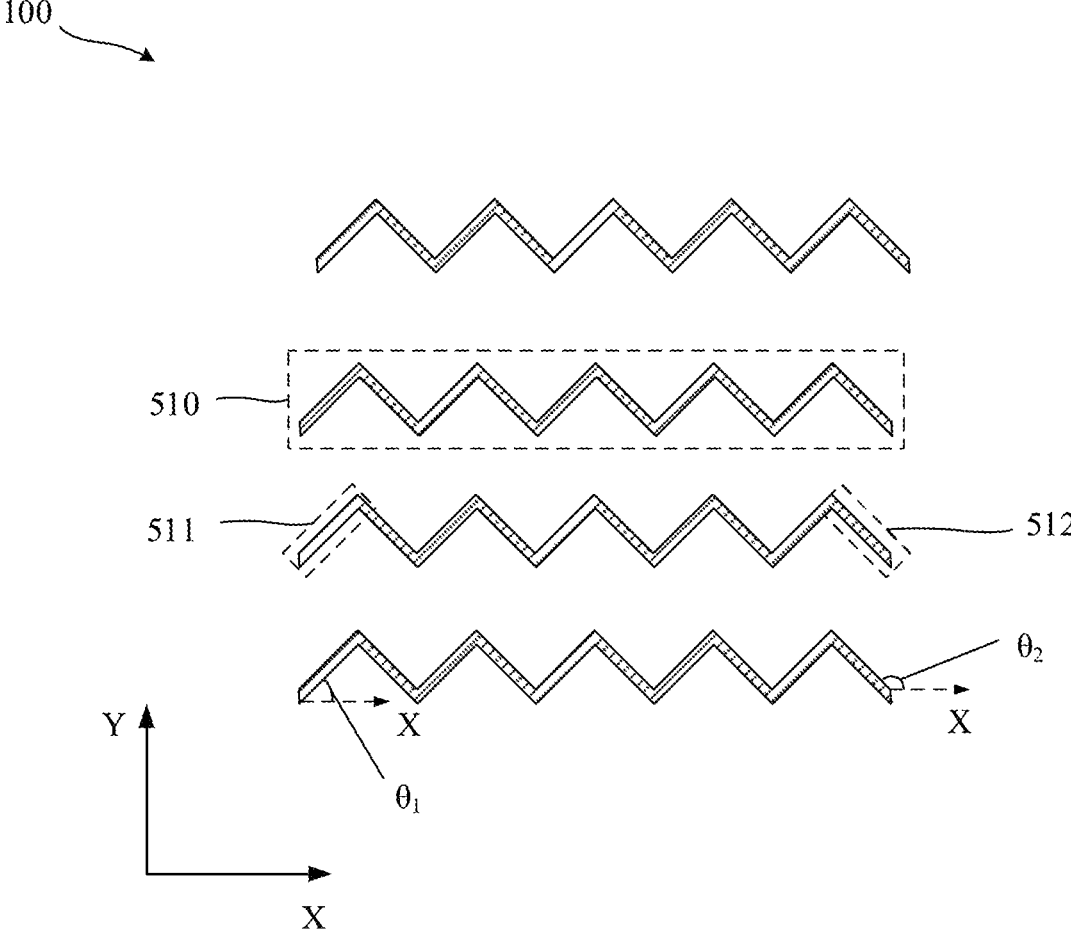
FIG. 11 is a partial schematic top view of an eleventh structure of a flexible support member provided by an embodiment of the present disclosure.

For details, refer to FIGS. 4 and 5. In the present embodiment, the rigid support component 300 further includes a third support layer 600 located on the other side of the first support layer 400, and elastic modulus of the third support layer 600 is greater than the elastic modulus of the second support layer 500. The third support layer 600 includes a plurality of second support units 610 disposed at intervals, and extension directions of any two of the second support units 610 are parallel. Support units are disposed at intervals on both sides of the first support layer 400, wherein the second support layer 500 and the third support layer 600 mainly play a role of supporting, and the first support layer 400 plays a role of supporting and helping restoring after bending. Accordingly, the two cooperate with each other to achieve a better supporting and restoring effect.

In the present embodiment, the first support layer 400 and the third support layer 600 are separately disposed, and a flexible component is filled between the first support layer 400 and the third support layer 600. For details, please refer to FIG. 4.

In the present embodiment, the extension direction of the second support unit 610 is parallel to a second direction, and an included angle between the first direction and the second direction is greater than 0 degrees and less than 180 degrees. For details, please refer to FIG. 6. The first support unit 510 and the second support unit 610 may form corresponding cross-arranged shapes, which is beneficial to disperse bending stress.

In the present embodiment, in response to the first support unit 510 being parallel to the second support unit 610, thicknesses of the second support layer 500 and the third support layer 600 is greater than a thickness of the first support layer 400. Thick material film layers are selected for an improved support. In response to the first support unit 510 is not parallel to the second support unit 610, i.e., in response to an included angle between the first direction and the second direction being greater than 0 degrees and less than 180 degrees, the thicknesses of the second support layer 500 and the third support layer 600 are both smaller than a thickness of the first support layer 400. Since it is further required to bend the material film layer, thin material film layers are selected for an improved restoring effect.

In the present embodiment, the flexible support member 100 includes a plane area A and a bending area B. In a direction close to a center of the bending area B, a distance between the two adjacent first support units 510 gradually increases, and a distance between two ones of the first openings 410 adjacent to each other gradually decreases. For details, please refer to FIG. 7. Distribution density of the first openings 410 is not shown in the figure since it is easy to understand. Enhancing restoring of the bending area B and appropriately reducing supporting of the bending area B may be beneficial to the restoring for the bending area B after bending, thereby extending a lifespan of the corresponding display module 10.

In the present embodiment, an area of an end surface of the first support unit 510 on one side close to the first support layer 400 is greater than an area of an end surface of the first support unit 510 on one side away from the first support layer 400. For details, please refer to FIG. 8. When it is required to bend the flexible support member 100, and two ends of the second support layer 500 are bent toward a central area of the second support layer 500. The end surface of a relative small area prevents the first support unit 510 from being pressed, so as to reduce bending resistance, thereby protecting performance of the flexible support member 100.

In the present embodiment, in a direction approaching the center of the bending zone B, the inclination angle of a side wall of the first support unit 510 gradually increases. It is possible to better prevent the first support units 510 itself from being pressed, so as to reduce the bending resistance, thereby protecting the performance of the flexible support member 100.

In the present embodiment, an aperture of each one of the first openings 410 is smaller than the distance between the two adjacent first support units 510, and the distance between the two adjacent first openings 410 is smaller than the corresponding distance between the two adjacent first support units 510. For details, please refer to FIG. 9. By reducing a size of each one of the first openings 410, restoring performance can be improved. Moreover, flexibility of the flexible support member 100 can be improved by a large amount of the flexible units filled in the first openings 410.

In the present embodiment, an included angle between the first support unit 510 and the first direction includes at least a first included angle $\theta_1$ and a second included angle $\theta_2$. The first included angle $\theta_1$ is the same with the second included angle $\theta_2$.

In the present embodiment, an included angle between the first support unit 510 and the first direction includes at least a first included angle $\theta_1$ and a second included angle $\theta_2$. The first included angle $\theta_1$ is different from the second included angle $\theta_2$. For details, please refer to FIG. 10. The first support unit 510 may be in a shape of a broken line or a curve, which is conducive to disperse bending stress. For details, please refer to FIG. 14. Since polylines or curves possess an ability of stress dispersion of multi-angles, strengthening effects of supporting force and restoring force are improved.

In the present embodiment, each one of the first support units 510 includes a plurality of first portions 511 and a plurality of second portions 512. An included angle between each one of the first portions 511 and the first direction is the first included angle $\theta_1$, and an included angle between each one of the second portions 512 and the first direction is the second included angle 82. The plurality of first portions 511 and the plurality of second portions 512 are alternately disposed periodically. The first included angle $\theta_1$ is an acute angle, and the second included angle $\theta_2$ is an obtuse angle. For details, please refer to FIG. 11.

In the present embodiment, the second support layer 500 further includes a plurality of auxiliary support units 520 which are located between each one of the first portions 511 and each one of the second portions 512 adjacent to each other. For details, please refer to FIG. 12. A thickness of the auxiliary support unit 520 is smaller than a thickness of the first support unit 510. For details, please refer to FIG. 13. FIG. 13 is a cross-sectional view taken along a line CC' in FIG. 12. The auxiliary support unit 520 can play a role of auxiliary support. By a length difference between the auxiliary support unit 520 and the first support unit 510, combined supporting and restoring forces can be increased, and supporting performance and restoring performance of the flexible support structure can be optimized.

In the present embodiment, the elastic component 200 may be rubber or silicone material, and the rigid support component 300 may be metal material, such as stainless steel, both of which are not limited herein.

In the embodiments of the present disclosure, by embedding the rigid support component in the elastic component, the rigid support component is integrally disposed with the elastic component, and the rigid support component includes two support layers with different rigidities, for improving the supporting and restoring performances, so that the supporting and restoring performances of the composite structure are improved, thereby extending the lifespans of the display modules.

Figure 15:
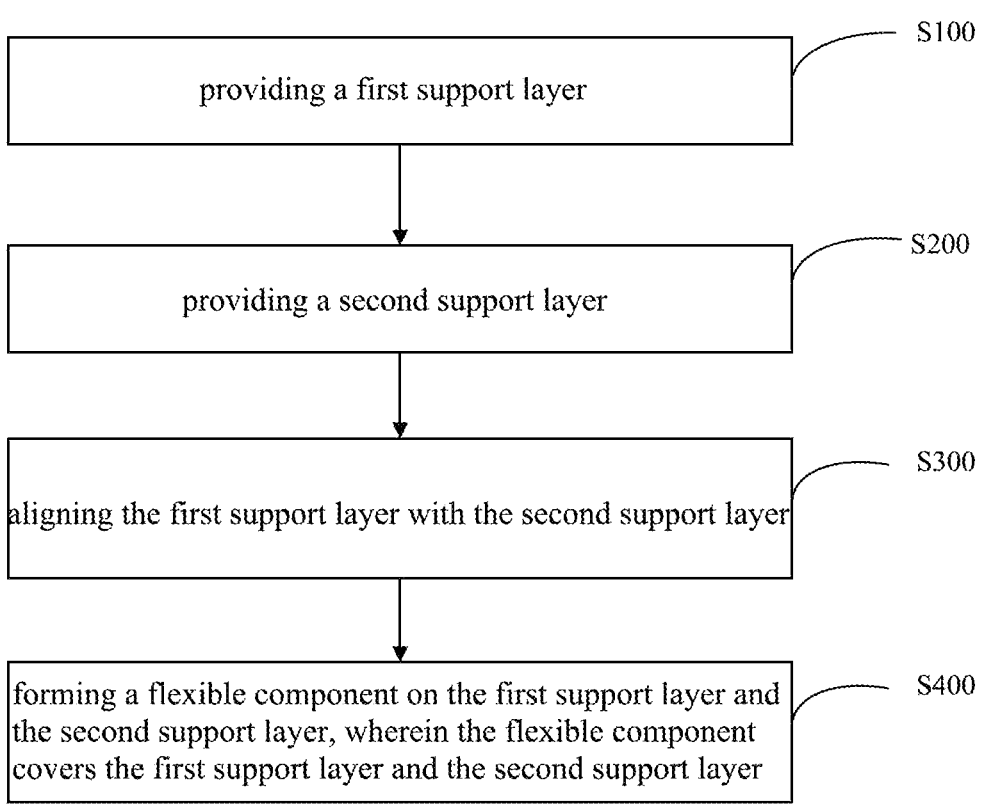
FIG. 15 is a flowchart of steps of a method for manufacturing a flexible support member provided by an embodiment of the present disclosure.

Refer to FIG. 15. An embodiment of the present disclosure further provides a method of manufacturing the flexible support member 100, including the following steps:

S100, providing a first support layer 400;

S200, providing a second support layer 500;

S300, aligning the first support layer 400 with the second support layer 500; and S400, forming a flexible component on the first support layer 400 and the second support layer 500, wherein the flexible component covers the first support layer 400 and the second support layer 500.

Elastic modulus of the first support layer 400 is smaller than elastic modulus of the second support layer 500.

In the embodiments of the present disclosure, by embedding the rigid support component in the elastic component, the rigid support component is integrally disposed with the elastic component, and the rigid support component includes two support layers with different rigidities, for optimizing the supporting and restoring performances, so that the supporting and restoring performances of the composite structure are improved, thereby extending the lifespans of the display modules.

The technical solution of the present disclosure is described in combination with specific embodiments.

The method of manufacturing the flexible support member 100 includes the step of:

S100, providing a first support layer 400.

For details, refer to FIGS. 2, 3, and 9. In the present embodiment, the first support layer 400 includes a plurality of first openings 410, and the second support layer 500 includes a plurality of first support units 510 disposed in parallel. The extending direction of each one of the first support units 510 is parallel to the first direction. At least one of the first openings 410 is disposed between two adjacent ones of the first support units 510. The first support unit 510 may be strip-shaped. That is, the strip-shaped first support unit 510 has great rigidity, and can provide an improved support effect. The first support layer 400 includes the plurality of first openings 410, which means that the first support layer 400 is grid-shaped. The grid-shaped first support layer 400 plays a role of supporting and helping restoring after bending. Accordingly, the two cooperate with each other to achieve a better supporting and restoring effect.

S200, providing a second support layer 500.

In the present embodiment, the first support layer 400 and the second support layer 500 constitute the rigid support component 300.

In the present embodiment, the flexible support member 100 includes a plane area A and a bending area B. In a direction close to a center of the bending area B, a distance between the two adjacent first support units 510 gradually increases, and a distance between the two adjacent first openings 410 gradually decreases. For details, please refer to FIG. 7. Distribution density of the first openings 410 is not shown in the figure since it is easy to understand. Enhancing restoring of the bending area B and appropriately reducing supporting of the bending area B may be beneficial to the restoring for the bending area B after bending, thereby extending a lifespan of the corresponding display module 10.

In the present embodiment, an area of an end surface of the first support unit 510 on one side close to the first support layer 400 is greater than an area of an end surface of the first support unit 510 on one side away from the first support layer 400. For details, please refer to FIG. 8. When the flexible support member 100 needs to be bent, and two ends of the second support layer 500 are bent toward a central area of the second support layer 500, the end surface of a smaller area prevents the first support unit 510 from being pressed, so as to reduce bending resistance, thereby protecting performance of the flexible support member 100.

In the present embodiment, in a direction approaching the center of the bending zone B, the inclination angle of a side wall of the first support unit 510 gradually increases. It is possible to better prevent the first support units 510 itself from being pressed, so as to reduce the bending resistance, thereby protecting the performance of the flexible support member 100.

In the present embodiment, an aperture of each one of the first openings 410 is smaller than the distance between the two adjacent first support units 510, and the distance between the two adjacent first openings 410 is smaller than the corresponding distance between the two adjacent first support units 510. For details, please refer to FIG. 9. By reducing a size of each one of the first openings 410, restoring performance can be improved. Moreover, flexibility of the flexible support member 100 can be improved by a large amount of the flexible units filled in the first openings 410.

In the present embodiment, an included angle between the first support unit 510 and the first direction includes at least a first included angle $\theta_1$ and a second included angle $\theta_2$. The first included angle $\theta_1$ is the same with the second included angle $\theta_2$.

In the present embodiment, an included angle between the first support unit 510 and the first direction includes at least a first included angle $\theta_1$ and a second included angle $\theta_2$. The first included angle $\theta_1$ is different from the second included angle $\theta_2$. For details, please refer to FIG. 10. The first support unit 510 may be in a shape of a broken line or a curve, which is conducive to disperse bending stress. For details, please refer to FIG. 14. Since broken lines or curves possesses an ability of stress dispersion of multi-angles, strengthening effects of supporting force and restoring force are improved.

In the present embodiment, each one of the first support units 510 includes a plurality of first portions 511 and a plurality of second portions 512. An included angle between each one of the first portions 511 and the first direction is the first included angle $\theta_1$, and an included angle between each one of the second portions 512 and the first direction is the second included angle 62. The plurality of first portions 511 and the plurality of second portions 512 are alternately disposed periodically. The first included angle 61 is an acute angle, and the second included angle $\theta_2$ is an obtuse angle. For details, please refer to FIG. 11.

In the present embodiment, the second support layer 500 further includes a plurality of auxiliary support units 520 which are located between each one of the first portions 511 and each one of the second portions 512 adjacent to each other. For details, please refer to FIG. 12. A thickness of the auxiliary support unit 520 is smaller than a thickness of the first support unit 510. For details, please refer to FIG. 13.

Figure 12:
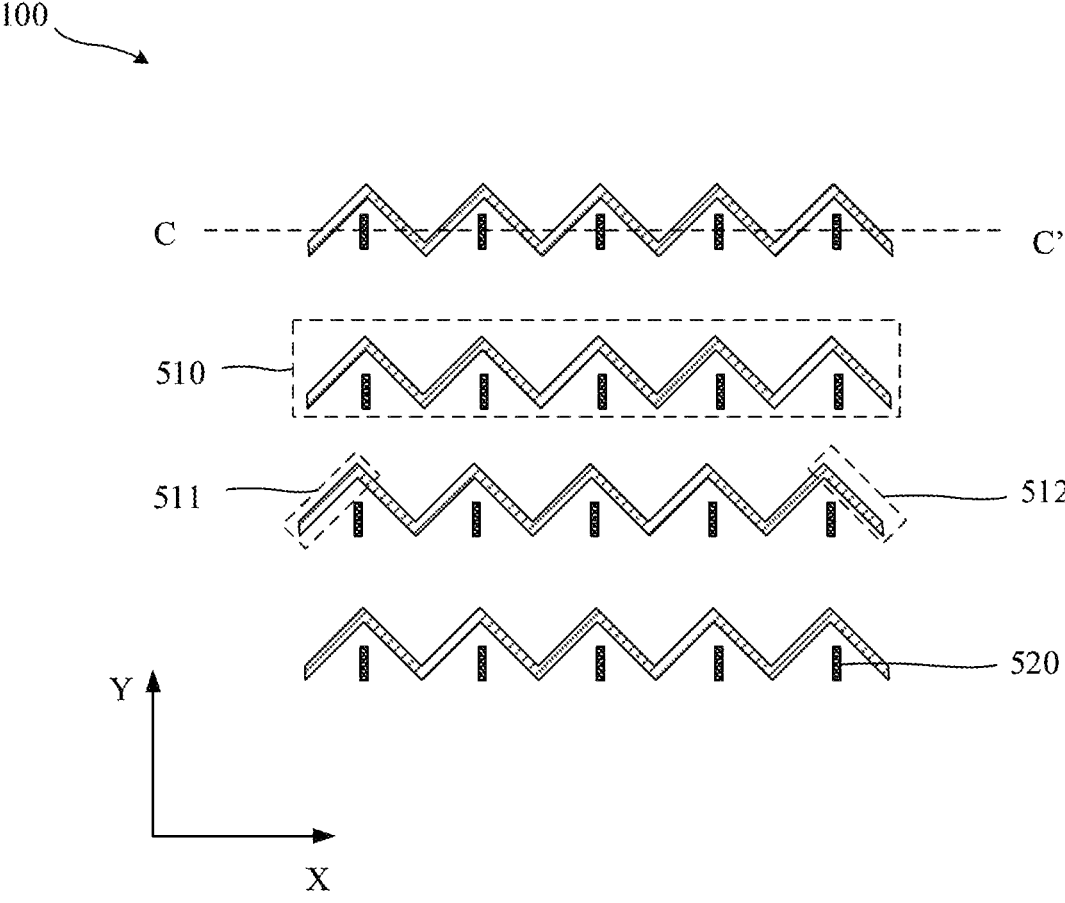
FIG. 12 is a partial schematic top view of a twelfth structure of a flexible support member provided by an embodiment of the present disclosure.
Figure 13:
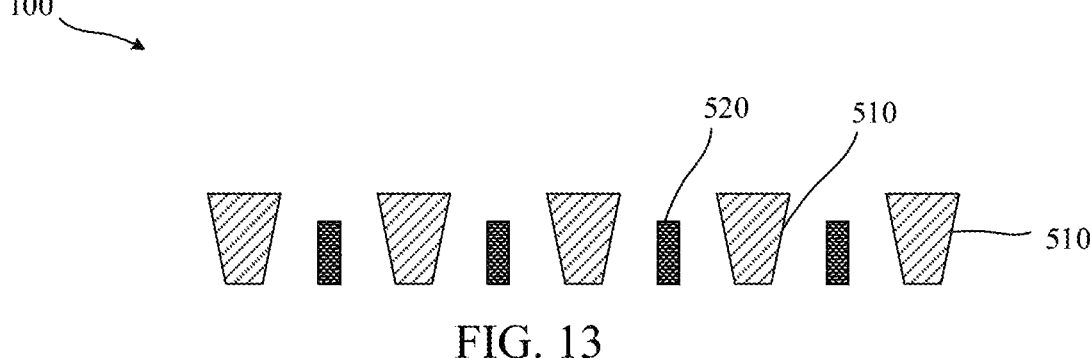
FIG. 13 is a partial structural diagram of a thirteenth structure of a flexible support member provided by the embodiment of the present disclosure.
Figure 14:
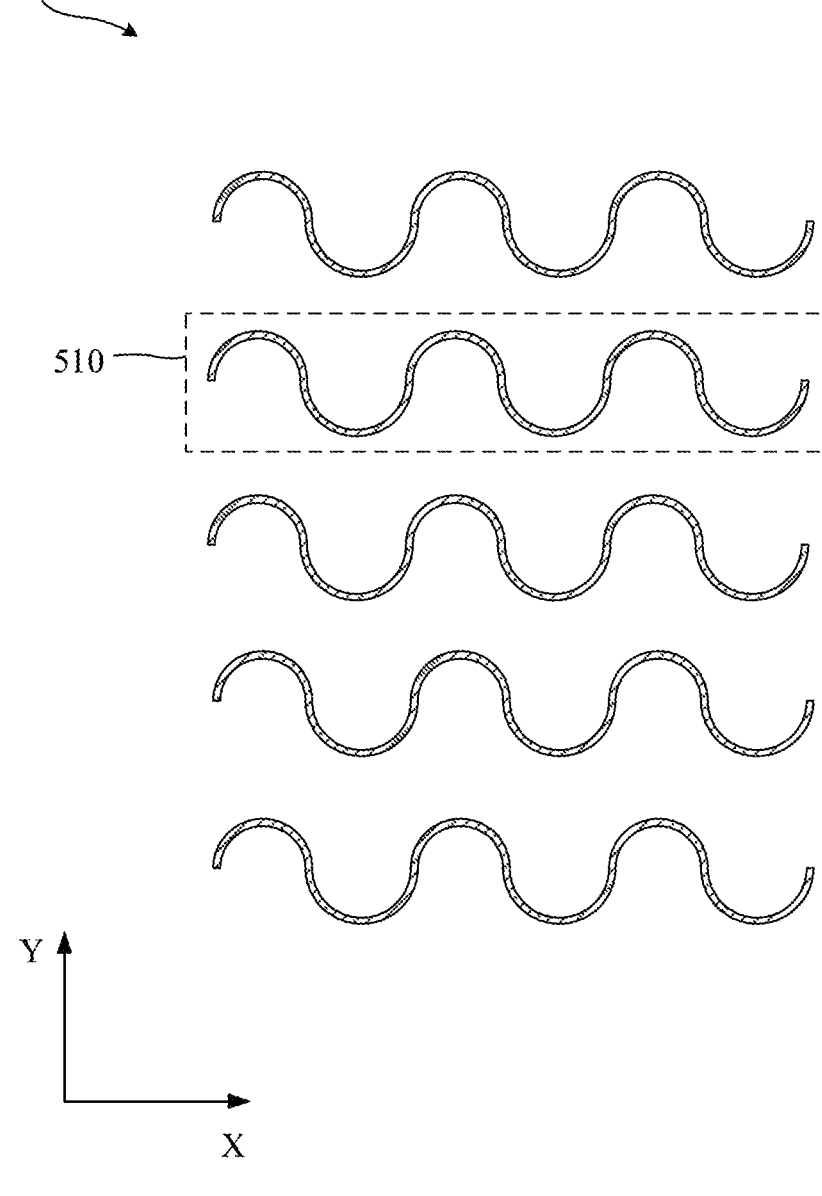
FIG. 14 is a partial schematic top view of a fourteenth structure of a flexible support member provided by an embodiment of the present disclosure.

FIG. 13 is a cross-sectional view taken along a line CC' in FIG. 12. The auxiliary support unit 520 can play a role of auxiliary support. By a length difference between the auxiliary support unit 520 and the first support unit 510, combined supporting and restoring forces can be increased, and supporting performance and restoring performance of the flexible support structure can be optimized.

In the present embodiment, the step of S200 includes steps of:

S210, providing a second support layer 500; and

S220, providing a third support layer 600.

For details, refer to FIGS. 4 and 5. In the present embodiment, the rigid support component 300 further includes a third support layer 600 located on the other side of the first support layer 400, and elastic modulus of the third support layer 600 is greater than the elastic modulus of the second support layer 500. The third support layer 600 includes a plurality of second support units 610 disposed at intervals, and extension directions of any two of the second support units 610 are parallel. Support units are disposed at intervals on both sides of the first support layer 400, wherein the second support layer 500 and the third support layer 600 mainly play a role of supporting, and the first support layer 400 plays a role of supporting and helping restoring after bending. Accordingly, the two cooperate with each other to achieve a better supporting and restoring effect.

In the present embodiment, the first support layer 400 and the third support layer 600 are separately disposed, and a flexible component is filled between the first support layer 400 and the third support layer 600. For details, please refer to FIG. 4.

In the present embodiment, the extension direction of the second support unit 610 is parallel to a second direction, and an included angle between the first direction and the second direction is greater than 0 degrees and less than 180 degrees. For details, please refer to FIG. 6. The first support unit 510 and the second support unit 610 may form corresponding cross-arranged shapes, which is beneficial to disperse bending stress.

In the present embodiment, in response to the first support unit 510 being parallel to the second support unit 610, thicknesses of the second support layer 500 and the third support layer 600 is greater than a thickness of the first support layer 400. Thick material film layers are selected for an improved support. In response to the first support unit 510 is not parallel to the second support unit 610, i.e., in response to an included angle between the first direction and the second direction being greater than 0 degrees and less than 180 degrees, the thicknesses of the second support layer 500 and the third support layer 600 are both smaller than a thickness of the first support layer 400. Since it is further required to bend the material film layer, thin material film layers are selected for an improved restoring effect.

S300, aligning the first support layer 400 with the second support layer 500.

In the present embodiment, the step of S300 includes steps of:

S310, aligning the first support layer 400 with the second support layer 500;

S320, aligning the third support layer 600 with the first support layer 400; and S400, forming a flexible component on the first support layer 400 and the second support layer 500, wherein the flexible component covers the first support layer 400 and the second support layer 500.

In the present embodiment, the step of S400 includes a step of:

S410a, forming a flexible component on the first support layer 400 and the second support layer 500, wherein the flexible component covers the first support layer 400 and the second support layer 500.

Alternatively, S410b, forming a flexible component on the first support layer 400, the second support layer 500, and the third support layer 600, wherein the flexible component covers the first support layer 400, the second support layer 500, and the third support layer 600.

In the embodiments of the present disclosure, by embedding the rigid support component in the elastic component, the rigid support component is integrally disposed with the elastic component, and the rigid support component includes two support layers with different rigidities, so that supporting and restoring performances are optimized, and supporting and restoring performances of composite structure are improved, thereby extending the lifespans of the display modules.

Figure 16:
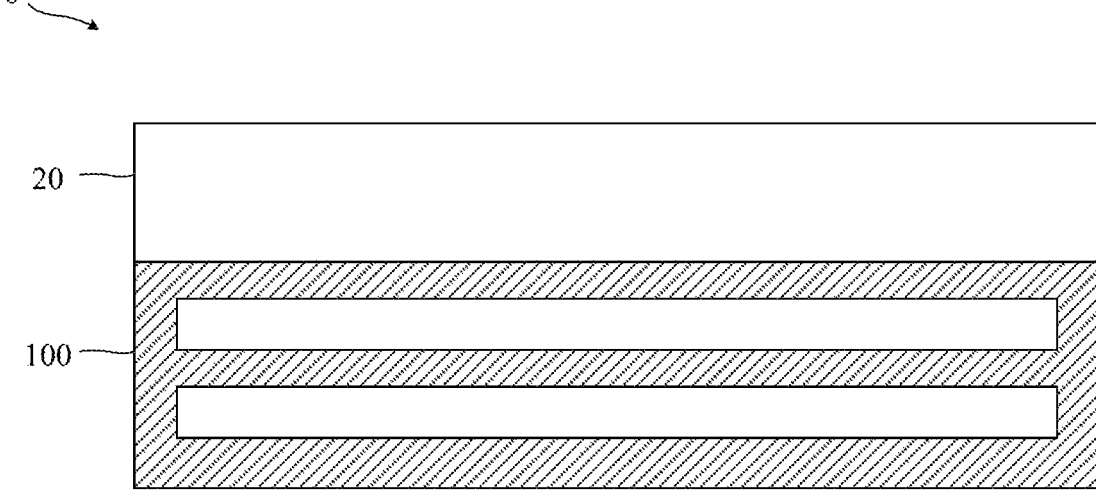
FIG. 16 is a schematic structural diagram of a display module provided by an embodiment of the present disclosure.

Refer to FIG. 16, an embodiment of the present disclosure further provides a display module 10, including any one of the above-mentioned flexible support members 100 and a display panel 20 located on the flexible support member 100, and the flexible support member 100 and the display panel 20 are combined into one body.

For specific structures of the flexible support member 100, please refer to any one of the above-mentioned embodiments of the flexible support member 100 and FIGS. 1-14, which are not repeated herein.

In the present embodiment, the display panel 20 includes an array substrate and a light-emitting component. The light-emitting component may be a self-luminous component or a backlight liquid crystal component. That is, a type of the display panel 20 may be a self-luminous display panel 20 or a liquid crystal display panel 20, which is not limited thereto.

Figure 17:
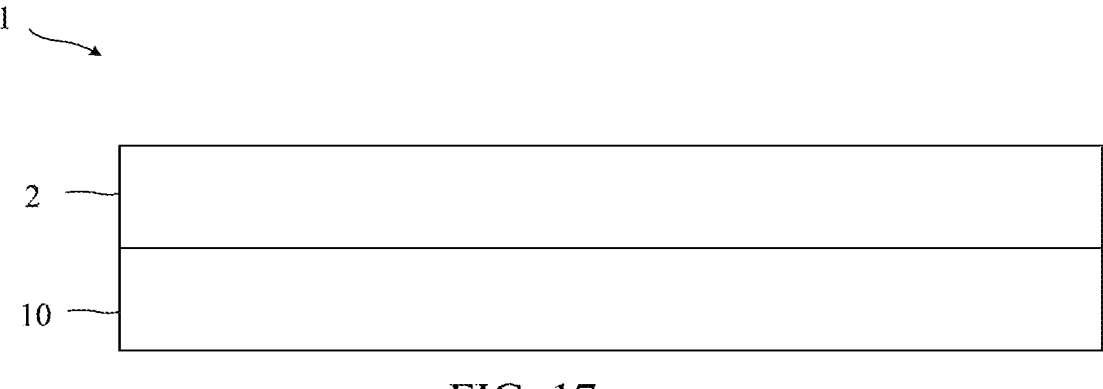
FIG. 17 is a schematic structural diagram of a mobile terminal provided by an embodiment of the present disclosure.

Refer to FIG. 17. An embodiment of the present disclosure further provides a mobile terminal 1, including any one of the above-mentioned display modules 10 and a terminal body 2, and the terminal body 2 and the display module 10 are combined into one body.

For specific structures of the flexible support member 100 and the display module 10, please refer to any one of the above-mentioned embodiments of the flexible support member 100 and the display module 10, and FIGS. 1-14, and 16, which are not repeated herein.

In the present embodiment, the terminal body 2 may include middle frames, sealant, etc., and the mobile terminal 1 may be mobile display terminals such as display devices, mobile phones, or tablets, both of which are not limited thereto.

The flexible support member, display module, and mobile terminal are disclosed by the embodiments of the present disclosure. The flexible support member includes the elastic component and the rigid support component embedded in the elastic component, and the rigid support component is integrally disposed with the elastic component. The rigid support component includes at least a first support layer and a second support layer located on one side of the first support layer, and the elastic modulus of the first support layer is smaller than that of the second support layer. In the embodiments of the present disclosure, by embedding the rigid support component in the elastic component, the rigid support component is integrally disposed with the elastic component, and the rigid support component includes two support layers with different rigidities, for optimizing supporting and restoring performances, so that the supporting and restoring performances of the composite structure are improved, thereby extending the lifespans of the display modules.

It can be understood that, for those of ordinary skill in the art, equivalent replacements or changes can be made according to the technical solutions of the present disclosure and inventive concept thereof. All these changes or replacements shall fall within the protection scope of the appended claims of the present disclosure.

What is claimed is:

1. A flexible support member for a flexible display product, comprising:

an elastic component; and a rigid support component embedded in the elastic component, wherein the rigid support component is integrally disposed with the elastic component;

wherein the rigid support component includes at least a first support layer having a plurality of first openings and a second support layer located on one side of the first support layer, the first support layer plays a role of supporting and helping restoring after bending and the second support layer plays a role of supporting, and elastic modulus of the first support layer is smaller than elastic modulus of the second support layer, wherein the second support layer includes a plurality of first support units disposed in parallel and a plurality of auxiliary support units, an extension direction of each one of the first support units is parallel to a first direction, each one of the first support units includes a plurality of first portions and a plurality of second portions, an included angle between each one of the first portions and the first direction is a first included angle, an included angle between each one of the second portions and the first direction is a second included angle, the first included angle is different from the second included angle, the auxiliary support units are located between the first portion and the second portion adjacent to each other, the auxiliary support units play a role of auxiliary support and are in non-contact with the first support units, and a thickness of the auxiliary support unit is smaller than a thickness of the first support unit.

2. The flexible support member for a flexible display product of claim 1, wherein at least one of the first openings is disposed between two adjacent ones of the first support units.

3. The flexible support member for a flexible display product of claim 2, wherein the rigid support component further includes a third support layer located on the other side of the first support layer, and elastic modulus of the third support layer is greater than the elastic modulus of the second support layer;

wherein the third support layer includes a plurality of second support units disposed at intervals, and extension directions of any two of the second support units are parallel.

4. The flexible support member for a flexible display product of claim 3, wherein the extension direction of the second support unit is parallel to a second direction, and an included angle between the first direction and the second direction is greater than 0 degrees and less than 180 degrees.

5. The flexible support member for a flexible display product of claim 2, wherein the flexible support member includes a plane area and a bending area, and in a direction close to a center of the bending area, a distance between the two adjacent first support units gradually increases, and a distance between two ones of the first openings adjacent to each other gradually decreases.

6. The flexible support member for a flexible display product of claim 2, wherein an area of an end surface of the first support unit on one side close to the first support layer is greater than an area of an end surface of the first support unit on one side away from the first support layer.

7. The flexible support member for a flexible display product of claim 2, wherein an aperture of each one of the first openings is smaller than the distance between the two adjacent first support units, and the distance between the two adjacent first openings is smaller than the corresponding distance between the two adjacent first support units.

8. A display module, comprising: a flexible support member and a display panel on the flexible support member for a flexible display product, wherein the flexible support member and the display panel are combined into one body, the flexible support member includes an elastic component and a rigid support component embedded in the elastic component, and the rigid support component is integrally disposed with the elastic component;

wherein the rigid support component includes at least a first support layer having a plurality of first openings and a second support layer located on one side of the first support layer, the first support layer plays a role of supporting and helping restoring after bending and the second support layer plays a role of supporting, and elastic modulus of the first support layer is smaller than elastic modulus of the second support layer, wherein the second support layer includes a plurality of first support units disposed in parallel and a plurality of auxiliary support units, an extension direction of each one of the first support units is parallel to a first direction, each one of the first support units includes a plurality of first portions and a plurality of second portions, an included angle between each one of the first portions and the first direction is a first included angle, an included angle between each one of the second portions and the first direction is a second included angle, the first included angle is different from the second included angle, the auxiliary support units are located between the first portion and the second portion adjacent to each other, the auxiliary support units play a role of auxiliary support and are in non-contact with the first support units, and a thickness of the auxiliary support unit is smaller than a thickness of the first support unit.

9. The display module of claim 8, wherein at least one of the first openings is disposed between two adjacent ones of the first support units.

10. The display module of claim 9, wherein the rigid support component further includes a third support layer located on the other side of the first support layer, and elastic modulus of the third support layer is greater than the elastic modulus of the second support layer;

wherein the third support layer includes a plurality of second support units disposed at intervals, and extension directions of any two of the second support units are parallel.

11. The display module of claim 10, wherein the extension direction of the second support unit is parallel to a second direction, and an included angle between the first direction and the second direction is greater than 0 degrees and less than 180 degrees.

12. The display module of claim 9, wherein the flexible support member includes a plane area and a bending area, and in a direction close to a center of the bending area, a distance between the two adjacent first support units gradually increases, and a distance between two ones of the first openings adjacent to each other gradually decreases.

13. The display module of claim 9, wherein an area of an end surface of the first support unit on one side close to the first support layer is greater than an area of an end surface of the first support unit on one side away from the first support layer.

14. The display module of claim 9, wherein an aperture of each one of the first openings is smaller than the distance between the two adjacent first support units, and the distance between the two adjacent first openings is smaller than the corresponding distance between the two adjacent first support units.

15. A mobile terminal, comprising: a display module and a terminal body, wherein the terminal body and the display module are combined into one body, the display module includes a flexible support member for a flexible display product and a display panel on the flexible support member, the flexible support member and the display panel are combined into one body, the flexible support member includes an elastic component and a rigid support component embedded in the elastic component, and the rigid support component is integrally disposed with the elastic component;

wherein the rigid support component includes at least a first support layer having a plurality of first openings and a second support layer located on one side of the first support layer, the first support layer plays a role of supporting and helping restoring after bending and the second support layer plays a role of supporting, and elastic modulus of the first support layer is smaller than elastic modulus of the second support layer, wherein the second support layer includes a plurality of first support units disposed in parallel and a plurality of auxiliary support units, an extension direction of each one of the first support units is parallel to a first direction, each one of the first support units includes a plurality of first portions and a plurality of second portions, an included angle between each one of the first portions and the first direction is a first included angle, an included angle between each one of the second portions and the first direction is a second included angle, the first included angle is different from the second included angle, the auxiliary support units are located between the first portion and the second portion adjacent to each other, the auxiliary support units play a role of auxiliary support and are in non-contact with the first support units, and a thickness of the auxiliary support unit is smaller than a thickness of the first support unit.

16. The mobile terminal of claim 15, wherein at least one of the first openings is disposed between two adjacent ones of the first support units.

17. The mobile terminal of claim 16, wherein the rigid support component further includes a third support layer located on the other side of the first support layer, and elastic modulus of the third support layer is greater than the elastic modulus of the second support layer;

wherein the third support layer includes a plurality of second support units disposed at intervals, and extension directions of any two of the second support units are parallel.

18. The mobile terminal of claim 17, wherein the extension direction of the second support unit is parallel to a second direction, and an included angle between the first direction and the second direction is greater than 0 degrees and less than 180 degrees.

\* \* \* \* \*